(12) United States Patent
Yoneda (10) Patent No.: US 7,975,148 B2
(45) Date of Patent: Jul. 5, 2011

(54) INFORMATION RECORDING MEDIUM REPRODUCING METHOD, INFORMATION RECORDING MEDIUM, REPRODUCING APPARATUS AND INFORMATION MEDIUM MANAGING METHOD

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1231 days.

(21) Appl. No.: 11/395,167

(22) Filed: Apr. 3, 2006

(65) Prior Publication Data

US 2006/0174138 A1    Aug. 3, 2006

Related U.S. Application Data

(63) Continuation of application No. 09/695,154, filed on Oct. 24, 2000, now Pat. No. 7,065,653.

(30) Foreign Application Priority Data

Oct. 25, 1999   (JP) ..................................... 11-301871

(51) Int. Cl.
*H04L 29/06* (2006.01)
*G06F 11/30* (2006.01)

(52) U.S. Cl. .......................... 713/193; 713/189; 713/153

(58) Field of Classification Search .................. 713/193, 713/189, 153
See application file for complete search history.

(56) References Cited

U.S. PATENT DOCUMENTS

| | | | |
|---|---|---|---|
| 6,704,872 B1 | 3/2004 | Okada | |
| 6,708,212 B2 | 3/2004 | Porras et al. | |

FOREIGN PATENT DOCUMENTS

| | | |
|---|---|---|
| JP | 09-017119 | 1/1997 |
| JP | 11-039262 | 2/1999 |
| JP | 11-161663 | 6/1999 |

OTHER PUBLICATIONS

Röscheisen (A Network-Centric Design for Relationship-Based Rights Management, Dec. 1997).*
Case No. 4:02CV498 CAS; Plaintiffs' Memorandum in Support of its Motion for Partial Summary Judgment Blizzard Entertainment, and *Vivendi Universal Games, Inc.*, Plaintiffs, v. *Internet Gateway*.*
United States Court of Appeals for the Eighth Circuit; Case No. 4:02CV498 CAS. On Appeal From the United States District Court for the Eastern District of Missouri Honorable Charles A. Shaw, United States District Judge. Opening Brief of Defendants-Appellants.*
CNET News Mar. 12, 2002 4:35 PM PST Group backs ISP in online gaming dispute By David Becker, Staff Writer, CNET News.*
An identity-based authentication and key establishment scheme for multi-operator maintained Wireless Mesh Networks Bing He; Agrawal, D.P.; Mobile Adhoc and Sensor Systems (MASS), 2010 IEEE 7th International Conference on Publication Year: 2010 , pp. 71-78.*

(Continued)

*Primary Examiner* — David Y Jung
(74) *Attorney, Agent, or Firm* — Oblon, Spivak, McClelland, Maier & Neustadt, L.L.P.

(57) ABSTRACT

In an information recording medium reproducing method, an information recording medium, a reproducing apparatus and an information recording medium managing method, a predetermined server is accessed on the basis of an address recorded in an information recording medium to issue key data from the server, and encrypted data recorded in the information recording medium are decrypted with the key data thus issued.

39 Claims, 7 Drawing Sheets

OTHER PUBLICATIONS

Wireless network token-based fast authentication; Kbar, G.; Telecommunications (ICT), 2010 IEEE 17th International Conference on; Publication Year: 2010, pp. 227-233.*

Secure certificateless-based authenticated key agreement protocol in the client-server setting; Hou Meng-bo; Xu Qiu-liang; IT in Medicine & Education, 2009. ITIME '09. IEEE International Symposium on vol. 1; Publication Year: 2009, pp. 960-965.* www.microsoft.com/windows/windowsmedia/WM7/DRM/FAQ.aspx.

A two-layer cryptographic scheme for an e-service framework based on mobile agents; Wang, T.I.; Tsai, K.H.; Lee, M.-C.; e-Technology, e-Commerce and e-Service, 2004. EEE '04. 2004 IEEE International Conference on Mar. 28-31, 2004 pp. 98-105.

Preserving integrity in remote file location and retrieval, Jaeger, T.; Rubin, A.D.; Network and Distributed System Security, 1996., Proceedings on the Symposium on Feb. 22-23, 1996 pp. 53-63.

* cited by examiner

| CONCERT DATA | | |
|---|---|---|
| MUSIC NUMBER DATA 1 | KEY DATA 1 | MUSIC TITLE 1 |
| MUSIC NUMBER DATA 2 | KEY DATA 2 | MUSIC TITLE 2 |
| MUSIC NUMBER DATA 3 | KEY DATA 3 | MUSIC TITLE 3 |
| ≈ | ≈ | ≈ |
| MUSIC NUMBER DATA 10 | KEY DATA 10 | MUSIC TITLE 10 |

FIG. 4

CONCERT OPENING PLACE/DATE LIST

SEPTEMBER

| DAYS OF PUBLIC PERFORMANCE | PLACE | DOOR OPENING/ CURTAIN RAISING | REFERENCE |
|---|---|---|---|
| SEPTEMBER 2 (THURSDAY) | ○○○ CULTURAL CENTER | 18:00/18:30 | ○○○○○○ |
| SEPTEMBER 4 (SATURDAY) | ×× FESTIVAL HALL | 17:45/18:30 | ×××××× |
| SEPTEMBER 5 (SUNDAY) | ○○ FESTIVAL HALL | 16:45/17:30 | ○○○○○○ |
| SEPTEMBER 10 (FRIDAY) | △△ SUN PALACE | 18:30/19:00 | △△△△△ |
| SEPTEMBER 11 (SATURDAY) | ○○ PREFECTURAL THEATER PLAY HALL | 18:00/18:30 | ○○○○○○ |
| .......... | .......... | .......... | .......... |

FIG. 6

INFORMATION RECORDING MEDIUM REPRODUCING METHOD, INFORMATION RECORDING MEDIUM, REPRODUCING APPARATUS AND INFORMATION MEDIUM MANAGING METHOD

BACKGROUND OF THE INVENTION

1. Field of the Invention

The present invention relates to an information recording medium reproducing method, an information recording medium, a reproducing apparatus and an information recording medium managing method, and it is applicable to a system for reproducing an optical disc on which music pieces are recorded, for example. Further, the present invention aims to access a predetermined server on the basis of an address recorded on an information recording medium to issue key data from the server thereto and decrypt encrypted data recorded on the information recording medium, whereby an user can easily and accurately re-listening to a music piece to which the user test-listened and took a fancy at a concert opening place or the like.

2. Description of the Related Art

Music pieces have been hitherto supplied to users through media such as optical discs, etc. For example, a music album is created by collectively recording on optical discs a series of music pieces selected by an artist, a recording company or the like. Further, a single disc is created by selecting a desired music piece from a music album thus created and recording it on optical discs.

Recently, a new service of distributing music pieces through the Internet to users has been started. Further, there is such a case that a user wishes to re-listen to a favorite music piece to which the user test-listened at a concert opening place or the like. In this case, if the user purchases an album containing his/her favorite music piece to listen to the favorite music piece, the user must purchase undesired music pieces. Further, for users which hardly purchase these types of media, it is a very heavy work to look for albums containing target music pieces.

Further, it may be considered that a user purchase a single disc to test-listen to his/her favorite music piece. However, such a favorite music piece may not be supplied in the form of a single disc. As compared with the case of albums, it is a further heavier work for a user to look for a single disc containing his/her target music piece.

On the other hand, through the distribution of music pieces to uses through the Internet, the users can download and enjoy only their favorite music pieces through the Internet. In this case, however, each user must search a home page distributing his/her desired music piece from many home pages, and further select the desired music piece from many music pieces distributed from this home page, so that the user must carry out an extremely intricate work. Further, it takes much time to download the desired music piece.

SUMMARY OF THE INVENTION

The present invention has been implemented in view of the foregoing problems, and has an object to provide an information recording medium reproducing method, an information recording medium, a reproducing apparatus and an information recording medium managing method with which a user can easily and accurately re-listen to a music piece to which the user test-listened and took a fancy at a concert opening place or the like.

According to a first aspect of the present invention, a method of reproducing an information recording medium on which encrypted data are recorded, is characterized by comprising the steps of: accessing a predetermined server on the basis of an address recorded on the information recording medium; and decrypting the encrypted data (releasing the encryption of the data) recorded on the information recording medium on the basis of key data issued from the server.

According to a second aspect of the present invention, an information recording medium is characterized in that encrypted data are recorded on the information recording medium so that the encrypted data can be decrypted on the basis of key data issued from a predetermined server, and an address required to access the server is recorded on the information recording medium.

According to a third aspect of the present invention, a reproducing apparatus for reproducing an information recording medium on which encrypted data are recorded, is characterized by comprising: access means for accessing a predetermined server on the basis of an address recorded on an information recording medium; and decrypting means for decrypting the encrypted data recorded on the information recording medium on the basis of key data issued form the server.

According to a fourth aspect of the present invention, an information recording medium managing method for managing an information recording medium on which encrypted data are recorded, is characterized in that key data for decrypting previously encrypted data are issued through an access based on an address recorded on the information recording medium.

According to the first aspect of the present invention, the predetermined server is accessed on the basis of the address recorded on the information recording medium and the encrypted data recorded on the information recording medium are decrypted with the key data issued from the server, whereby various kinds of encrypted data which are recorded and distributed on the information recording medium can be used with a simple operation. Accordingly, for example, an information recording medium such as an optical disc on which music pieces performed at a concert opening place or the like are encrypted and recorded is distributed, and a user can easily and accurately re-listen to a music piece which the user test-listened and took a fancy at the concert opening place or the like.

According to the second aspect of the present invention, the encrypted data are recorded on the information recording medium so that the encrypted data can be decrypted on the basis of the key data issued from the predetermined server, and the address required to access the server is also recorded on the information recording medium. Therefore, with respect to the encrypted data recorded on the information recording medium, the user can utilize the encrypted data by accessing the server easily as occasion demands. Accordingly, for example, an information recording medium such as an optical disc on which music pieces performed at a concert opening place or the like are encrypted and recorded is distributed, and a user can easily and accurately re-listen to a music piece which the user liked in the concert opening place or the like.

According to the third aspect of the present invention, the reproducing apparatus has the access means for accessing the predetermined server on the basis of the address recorded on the information recording medium, and the decrypting (encryption releasing) means for decrypting the encrypted data recorded on the information recording medium on the basis of the key data issued from the server. Therefore, by merely recording and distributing various encrypted data on an information recording medium, the data recorded on the information recording medium can be used with a simple operation. Accordingly, for example, an information recording medium such as an optical disc on which music pieces performed at a concert opening place or the like are encrypted and recorded is distributed, and a user can easily and accurately re-listen to a music piece which the user liked in the concert opening place or the like.

According to the fourth aspect of the present invention, the key data for decrypting previously encrypted data are issued through an access based on the address recorded on the information recording medium. Therefore, by merely recording and distributing various encrypted data on an information recording medium, the data recording on the information recording medium can be used with a simple operation. Accordingly, for example, an information recording medium such as an optical disc or the like on which music pieces performed at a concert opening place or the like are encrypted and recorded is distributed, and a user can easily and accurately re-listen to a music piece which the user liked in the concert opening place or the like.

DETAILED DESCRIPTION OF THE PREFERRED EMBODIMENT

A preferred embodiment according to the present invention will be described with reference to the accompanying drawings.

(1) Construction of Embodiment

Figure 1:
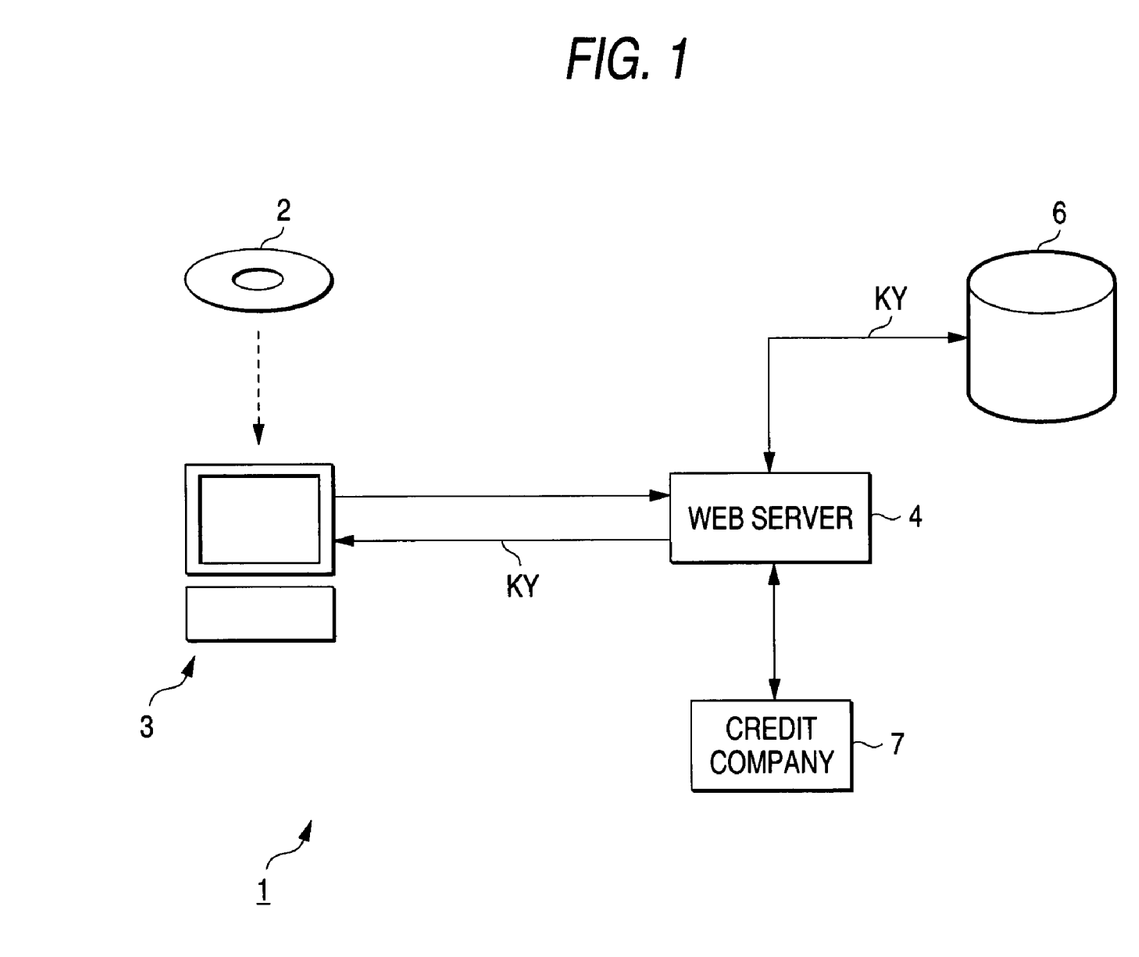
FIG. 1 is a block diagram showing a music supply system according to an embodiment of the present invention.

FIG. 1 is a block diagram showing a music supply system according to an embodiment of the present invention.

In the music supply system 1, music pieces performed at a concert opening place or the like are collectively recorded on compact discs 2 serving as information recording media and then these compact discs 2 are distributed to users. Each user can test-listen to his/her favorite music piece from the music pieces recorded on the compact disc 2 in accordance with a user's operation.

Figure 2:
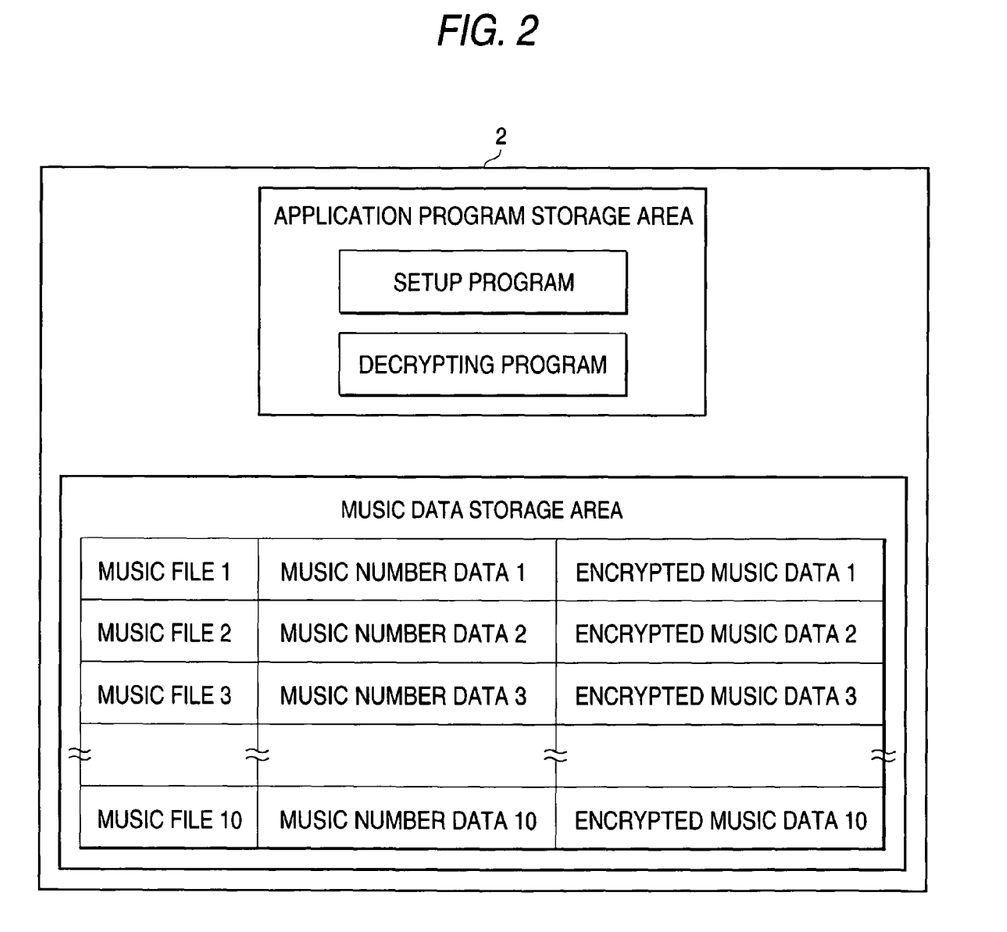
FIG. 2 is a table showing the content of a compact disc 2 in the music supply system 1 of FIG. 1.

As shown in FIG. 2, in the compact disc 2, the information recording face is divided into an application program storage area and a music data storage area, and a predetermined URL (Uniform Resource Locator), a setup program and a decrypting program are recorded in the application program storage area. URL is an address for specifying a server 4 described later and further specifies a home page on the compact disc 2 from each home page recorded in the data base 6.

The setup program is an application program for executing a series of processing as described later. Upon execution of this processing, the setup program starts a WWW (World Wide Web) browser to obtain key data from the predetermined server 4 and further operate a decrypting (encryption releasing) program. The setup program is set so as to automatically start when the compact disc 2 is loaded into the personal computer 3, whereby a user can test-listen to a music piece recorded on the compact disc 2 with a simple operation.

On the other hand, the decrypting (encryption releasing) program is an application program for decrypting the encrypted music data recorded in the music data storage area by using the key data.

That is, in the music data storage area are recorded a concert in which this compact disc is distributed, and music data for music pieces which are scheduled to be performed in this concert. The music data are created as follows: audio data are filed every music piece; the audio data thus filed are encrypted with key data for each music piece; and music number data serving as identification data for identifying each file are allocated to each file, and then the music data thus created are recorded in the music data storage area.

In the construction shown in FIG. 2, 10 music pieces are recorded in association with music files 1 to 10, and the respective music files 1 to 10 are specified with music number data 1 to 10.

In the music supply system 1, the personal computer 3 executes a series of processing steps according to a setup program recorded on the compact disc 2, and accesses the Web server 4 on the basis of URL recorded on the compact disc 2. Further, the personal computer 1 gets a home page on the compact disc 2 from the Web server 4 and displays it, and also it obtains key data KY for user's desired music data in accordance with the user's operation on the home page thus obtained. The personal computer 3 decrypts (releases the encryption of) the music data with the key data KY. When the personal computer 3 gets the key data KY, it executes charging processing through the data communication with the Web server 4.

In response to a request from the personal computer 3, the Web server 4 accesses the data base 6 and transmits the key data KY, etc. to the personal computer 3. The Web server 4 further accesses the server of a credit company 7 through a predetermined telephone line to execute the charging processing for the key data KY to be supplied to the personal computer 3.

Figure 3:
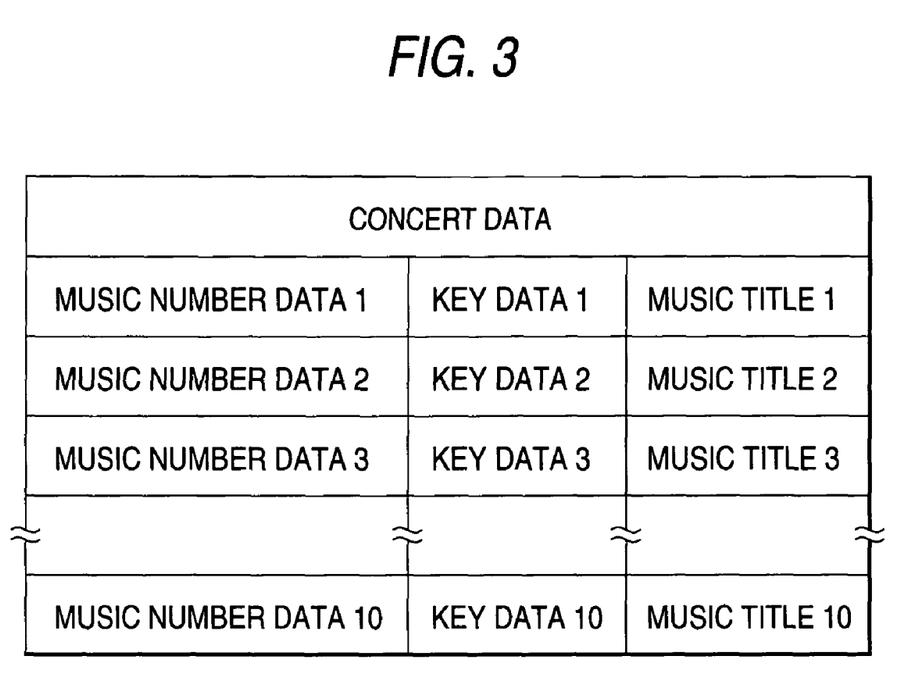
FIG. 3 is a table showing the content of disc data recorded in a data base in the music supply system 1 of FIG. 1.

The data base 6 is constructed so that the disc data are recorded in the data base 6 every compact disc managed by the data base 6. Each disc data can be specified on the basis of URL recorded on each compact disc. To the disc data are allocated concert data having information on a concert in which each compact disc 2 is distributed, key data required to decrypt (release the encryption of) each music data recorded on the compact disc 2, and the corresponding music number data and music title data as shown in 3.

Here, the concert data comprise data for specifying concert opening place, date, place, etc of the concert in which the compact disc 2 is distributed, data for specifying music pieces performed at each concert opening place in association with music number data, data representing the performance order of the music pieces in each concert, etc.

Figure 4:
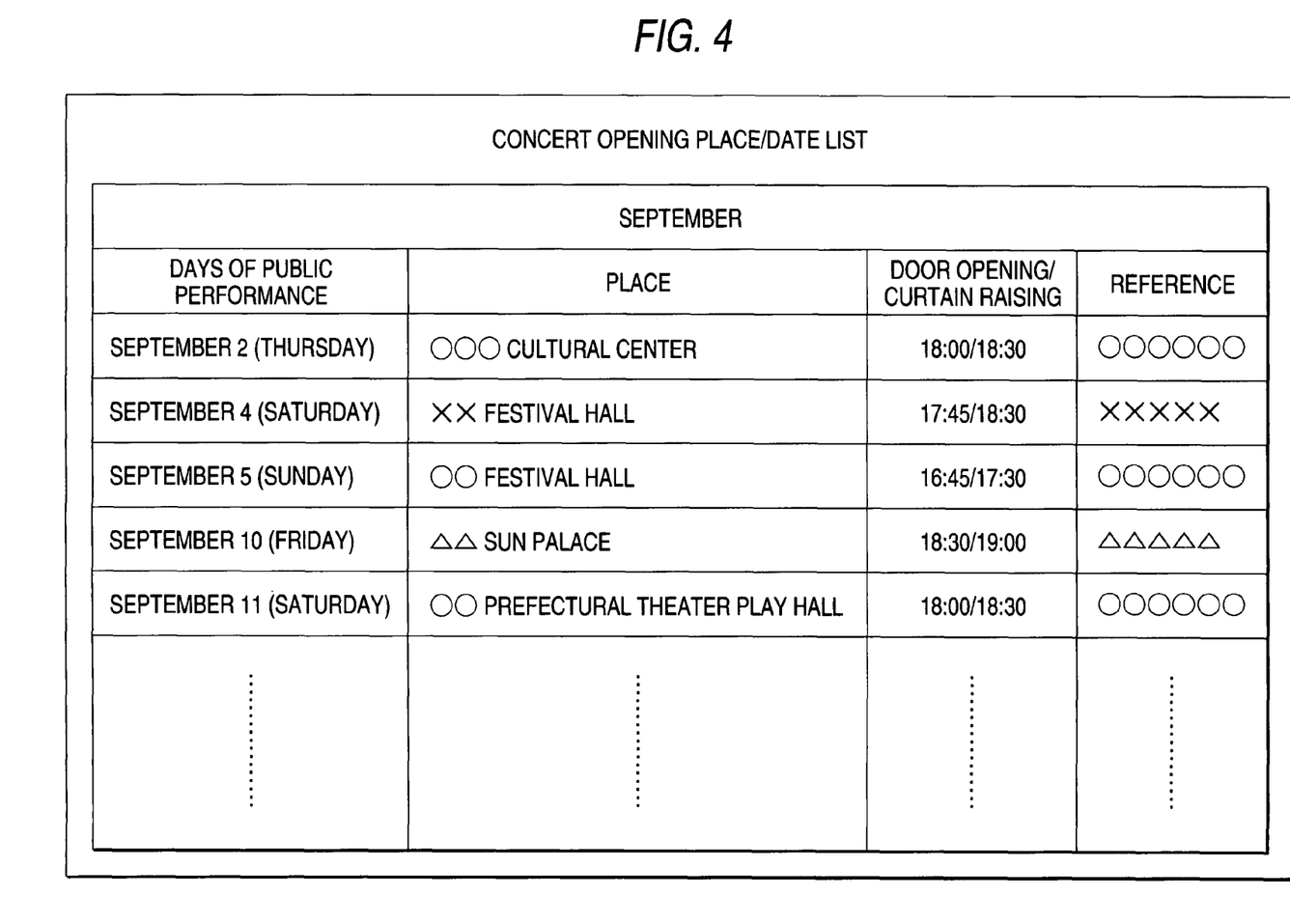
FIG. 4 is a plan view showing a display of a concert program list constructed by the disc data of FIG. 3.
Figure 5:
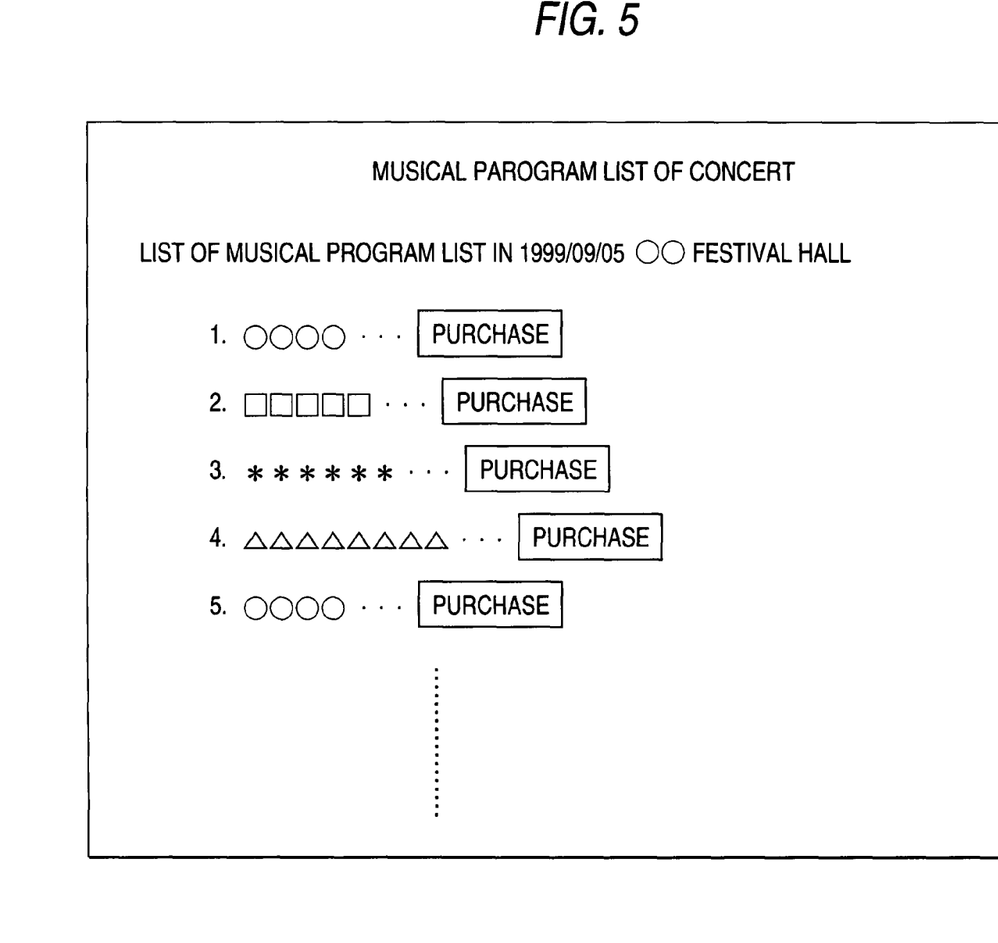
FIG. 5 is a plan view showing a display of a list of music titles constructed by the disc data of FIG. 3.

The disc data are described in the format of HTML (Hyper Text Makeup Language). When the personal computer 3 accesses the Web server 4 on the basis of URL recorded on the compact disc 2 to open the corresponding home page, a display frame as shown in FIG. 4 is displayed on the screen of the personal computer 3 so that the user can check a list of the concerts in which the compact disc 2 is distributed. Further, by tracing links set on a display of any concert of the list through the personal computer 3, a display frame as shown in FIG. 5 is obtained, whereby the user can check a list of music titles performed in the concert concerned in the performance order.

A "purchase" menu is displayed for each music title, and a predetermined charging processing home page can be accessed by selecting this menu.

Accordingly, at the Web server 4 side, the charging processing is executed in response to a user's operation carried out on the displayed home page for the music title list in the personal computer 3, and further when the correct charging processing is executed, the key data KY corresponding to the display of a desired music title is transmitted on the basis of the music number data thereof to the personal computer 3.

Figure 6:
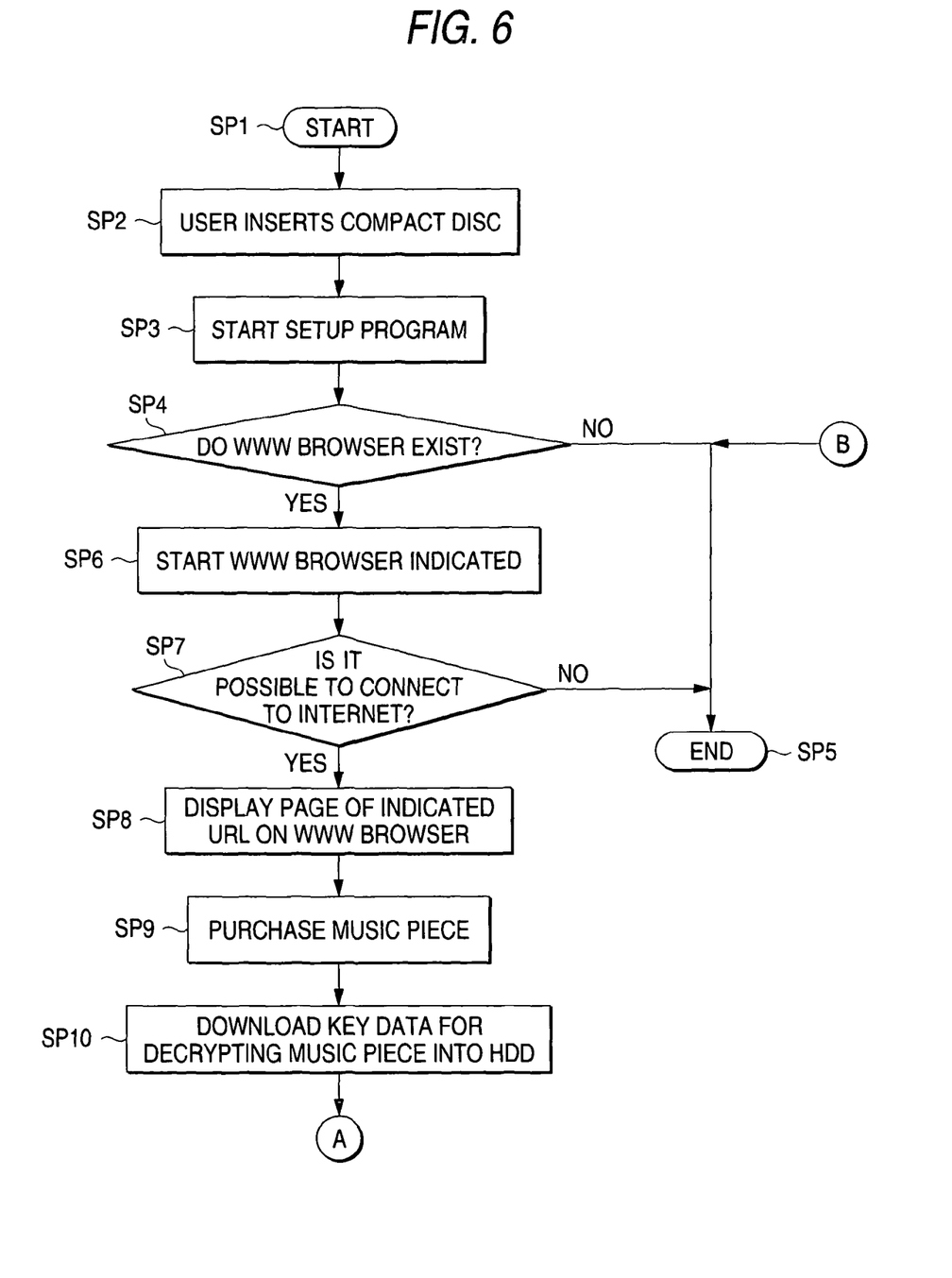
FIG. 6 is a flowchart showing the processing flow of a personal computer of FIG. 1.
Figure 7:
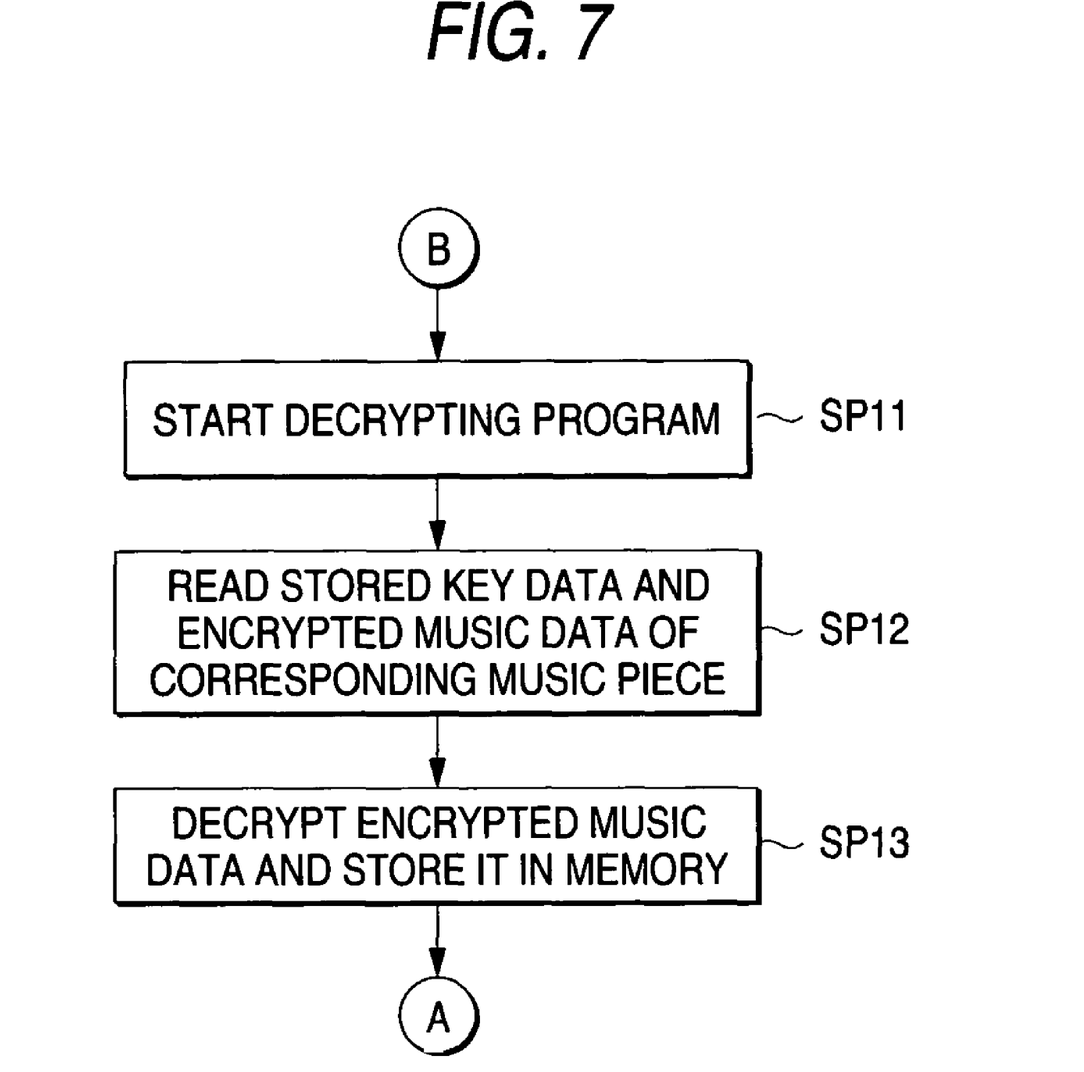
FIG. 7 is a flowchart showing the subsequent processing flow of FIG. 6.

FIGS. 6 and 7 are flowcharts showing the processing steps of the personal computer 3 which are executed on the basis of the setup program recorded on the compact disc 2.

After the power is turned on, the personal computer 3 shifts the processing from step SP1 to step SP2 and waits until the compact disc 2 is loaded by the user. When the compact disc 2 is loaded, the personal computer 3 shifts the processing to step SP3 to start the setup program, and the processing is shifted to step SP4 by the setup program.

In the step SP4, the personal computer 3 judges whether a WWW browser serving as a reading software for the Internet exists or not. If a negative judgment is obtained, the processing is shifted to step SP5 to finish the processing.

On the other hand, if the WWW browser exits, a positive result is obtained in the step SP4, and the personal computer 3 shifts the processing to step SP6 to start the WWW browser. At this time, the personal computer 3 starts the WWW browser on the basis of URL recorded on the compact disc 2.

Subsequently, the personal computer 3 shifts the processing to step SP7 to judge whether it can be connected to the Internet. Here, for example when it is difficult for the personal computer to connect to the Internet because no modem is mounted or the like, the negative result is obtained in the step SP7 in the personal computer 3, and thus the personal computer 3 shifts the processing to step SP5 to finish this processing.

On the other hand, if the personal computer can be connected to the Internet, the positive result is obtained in the step SP7 and thus the personal computer 3 shifts the processing to step SP8 to display the home page based on the indicated URL with the WWW browser, whereby the personal computer 3 can access the server 4 on the basis of the address recorded on the compact disc 2 and further access the data base 6, and open the home page (FIG. 4) corresponding to the compact disc 2.

When the user selects any one of the concerts displayed on the home page, the personal computer 3 switches the display thereof while tracing the link to the concert through the processing of the WWW browser, and displays the list of the music tiles as shown in FIG. 5.

When the user selects the purchase menu on the display of the list, the personal computer 3 shifts the processing to step SP9 to trace the link set on this menu and displays a menu frame for charging processing. Here, when the user inputs data required for the charging processing such as a user's name, a password, a credit card number, etc. and then operates a predetermined menu, the personal computer 3 transmits these data to the Web server 4, whereby the charging processing is executed by the Web server 4 in the music supply system 1.

When the charging processing as described is normally completed, the personal computer 3 shifts the processing to step SP10 to download from the server 4 the key data KY corresponding to the music title on which the charging processing has been carried out, and stores the key data KY into a built-in hard disc device.

Subsequently, the personal computer 3 shifts the processing to step SP11 (FIG. 7) to start the decrypting program (encryption releasing program). In the subsequent SP12, the key data KP stored is read out and delivered to the decrypting program. Further, on the basis of the music number data of this key data KY, the corresponding music data are reproduced from the compact disc and delivered to the decrypting program.

Subsequently, in step SP12 the personal computer 3 executes the decrypting program to decrypt the music data, and stores the audio data thus obtained into the hard disc device. Thereafter, the personal computer 3 returns its processing to step SP5 to finish this processing.

Accordingly, in the personal computer 3, the audio data thus recorded in the hard disc device can be reproduced with a desired application program.

(2) The Operation of the Embodiment

In the music supply system 1 thus constructed (FIG. 1), the audio data of music pieces which are scheduled to be performed by respective artists in a concert are encrypted in advance and recorded together with a setup program, a decrypting program, etc. to thereby form compact discs 2 (FIG. 2).

Further, the data of a list of concerts. (FIG. 4) in which the compact discs 2 thus created are distributed and the data of a list of music titles (FIG. 5) to be performed in each concert linked to the concert list are recorded in the data base 6 together with the key data for decrypting music data recorded in the compact discs 2 and the music number data serving as the corresponding identification data every compact disc 2 thus created. The data base 6 is constructed so that the list of concerts and the list of music titles can be displayed on the basis of the data recorded in the data base 6. In addition, the music supply system 1 is set so that the home page of the list of concerts can be accessed on the basis of URL recorded on each compact disc 2.

That is, in the compact disc 2, URLs for specifying the Web server 4 and also the home page of the list of concerts are recorded and created so that the home page of the list of corresponding concerts recorded in the data base 6 can be accessed. Further, the music number data corresponding to the music number data recorded in the data base 6 are allocated every music data and recorded (FIG. 2).

Accordingly, in the music supply system 1, music pieces to be performed in each concert are recorded in compact discs 2 so that users can listen to their favorite music pieces only when the users access the server 4 and get the corresponding key data, and these compact discs 2 are distributed to users in each concert free of charge.

Accordingly, when a user wants to listen to a his/her favorite music piece performed in a concert again, the user can purchase and listen to only the favorite music piece without visiting a record shop or without knowing an album title containing the favorite music piece by merely accessing the server 4 on the basis of URL recorded on a compact disc 2 distributed in the concert to get the corresponding key data KY. Therefore, the user can easily and accurately listen to the his/her favorite music piece which the user test-listened to and liked at a concert opening place or the like.

In this case, by recording URLs on the compact disc 2 and enabling the user to not only access the server 4, but also watch the home page corresponding to the compact disc 2, a work of searching the data base 6 fully to look for a desired music piece can be simplified, and thus the desired music piece can be accurately purchased with a simple work.

Further, the music data are encrypted every file (corresponding to each music piece) and the key data corresponding to the file are set, so that the user can selectively listen to his/her desired music piece.

Further, by setting home pages, a list of concerts corresponding to a compact disc 2 is displayed and further a list of music pieces to be performed in each concert is displayed in performance order to promote a user to select his/her favorite music piece. Therefore, even when the user does not know the title of the favorite music piece, the user can get the key data for the favorite music piece on the basis of the performance order and listen to the favorite music piece.

That is, in the music supply system 1, when the compact disc 2 is loaded into the personal computer 3 (FIG. 6), the setup program recorded on the compact disc 2 is started, the server 4 is accessed on the basis of URL recorded on the compact disc 2 and further the home page of a list of concerts which corresponds to the compact disc 2 recorded in the data base 6 is accessed. In the music supply system 1, this home page is displayed (FIG. 4), and when a user selects one of the concerts in the list display which the user visited, a list of music pieces performed in this concert is displayed in the performance order by tracing the link set in the above display (FIG. 5). Further, when the user operates the purchase menu on the display to select his/her favorite music piece, the charging processing for the purchase of the music piece is executed. If the charging processing is correctly executed, in the music supply system 1, the corresponding key data KY are downloaded from the Web server 4 to the personal computer 3, the encrypted music data of the music piece selected by the user are decrypted with the key data KY and then the music data thus decrypted are downloaded into the hard disc device of the personal computer 3. Accordingly, the user can listen to the music piece at all times.

(3) Effect of Embodiment

According to the above construction, a predetermined server is accessed on the basis of an address recorded on the compact disc to issue key data for a favorite music piece from the server, and encrypted music data recorded on a compact disc are decrypted with the key data thus issued, whereby a user can easily and accurately listen to the favorite piece to which the user test-listened and took a fancy in a concert opening place or the like.

At this time, the server and the home page corresponding to the compact disc 2 are accessed on the basis of URLs which specify the server and the home page concerned, whereby the user can easily select his/her favorite music piece.

Further, the music data are encrypted every file (every music piece), and thus the operator can selectively purchase only a favorite music piece.

(4) Other Embodiments

In the above embodiment, the decrypted music data are downloaded and stored into the hard disc device. However, the present invention is not limited to this embodiment. The decryption of the music data of a favorite music piece is carried out every time the operator listens to the music piece. In this case, the encrypted music data may be stored in the hard disc device, or the music data stored on the compact disc 2 may be reproduced and decrypted every time the user listens to the music piece.

In the above embodiment, the decrypting program (the encryption releasing program) is recorded on the compact disc. However, the present invention is not limited to this embodiment. For example, the decrypting program may be downloaded together with the key data.

In the above embodiment, the key data are merely downloaded. However, the present invention is not limited to this embodiment. For example, the key data may be supplied while encrypted, and then decrypted and used at the personal computer 3 side.

Further, in the above embodiment, the music data are encrypted every music piece (which corresponds to a file). However, the present invention is not limited to this embodiment, and the music data may be encrypted every music pieces, that is, every plural files.

In the above embodiment, the home page corresponding to the compact disc is accessed to display a list of concerts, and a list of music pieces is displayed on the basis of the display of the list of concerts. However, the present invention is not limited, and a home page for promoting a music piece and purchase or non-purchase may be directly accessed on the basis of URL recorded on a compact disc. This access manner which is made with omitting a home page for a list of concerts as described above may be applied to such a case that music pieces to be performed in each concert and the performance order of the music pieces are not varied and such a case that music pieces to be performed are long in performance time such as classic music pieces and only a slight number of music pieces can be recorded on the compact disc.

In the above embodiment, the music pieces are supplied by using compact discs as information recording media. However, the present invention is not limited to this embodiment, and it is broadly applicable to various cases where various data are supplied by various information recording media such as various optical discs, memory cards serving as card type recording media each having a memory, etc.

In the above embodiment, the music pieces are supplied. However, the present invention is not limited to this embodiment. For example, the present invention may be applied to such a case that various application programs are supplied and such a case that data of a data base are supplied. In this case, the data of application programs may be encrypted every directory comprising plural files.

In the above embodiment, the music number data are recorded as identification data for identifying each music data. However, the present invention is not limited to this embodiment. For example, a file name and a directory name (holder name) may be used as identification data.

As described above, according to the present invention, a predetermined server is accessed on the basis of an address recorded on an information recording medium, key data are issued from the server and the data recorded on the information recording medium with the key data thus issued are decrypted, whereby a user can easily and accurately listen to a music piece to which the operator test-listened and took a fancy at a concert opening place or the like.

What is claimed is:

1. A method of reproducing encrypted data recorded on a portable storage medium, comprising:

reading, at an information processing apparatus, data from the portable storage medium after insertion of the portable storage medium into the information processing apparatus, wherein encrypted data is recorded on the portable storage medium prior to the insertion of the portable storage medium into the information processing apparatus;

transmitting, from the information processing apparatus to a server via a network, a request for decryption key data corresponding to the encrypted data previously recorded on the portable storage medium, the decryption key data being required for the information processing apparatus to reproduce the encrypted data;

receiving, at the information processing apparatus, the requested decryption key data from the server via the network; and decrypting, at the information processing apparatus, the encrypted data previously recorded on the portable storage medium, the encrypted data being decrypted with the received decryption key data issued from said server.

2. The information reproducing method as claimed in claim 1, wherein the request for the decryption key data is transmitted based on information recorded on the portable storage medium specifying said server corresponding to said encrypted data recorded on the portable storage medium.

3. The information reproducing method as claimed in claim 1, wherein the encrypted data are recorded in one or more files in the portable storage medium, the encryption of the encrypted data is carried out so that corresponding decryption key data decrypts the one or more files, and identification data for specifying the one or more files are recorded in the portable storage medium, and said method further comprises:

releasing the encryption of the one or more files on the basis of the identification data.

4. A non-transitory computer readable portable storage medium configured to have data recorded thereon and accessed by an information reproducing apparatus, the portable storage medium comprising:

encrypted multimedia data and address information to access a predetermined server recorded therein prior to insertion of the portable storage medium into the information reproducing apparatus, wherein the address information is read by the information reproducing apparatus after insertion of the portable storage medium into the information reproducing apparatus, the information reproducing apparatus transmits a request to the predetermined server for decryption key data corresponding to the encrypted multimedia data previously recorded on the portable storage medium, and receives the requested decryption key data from the predetermined server, the decryption key data being required for the information reproducing apparatus to reproduce the encrypted multimedia data, and wherein said encrypted multimedia data is decrypted with the received decryption key data by a processor of the information reproducing apparatus.

5. The portable storage medium as claimed in claim 4, wherein the address information is data for specifying said predetermined server.

6. The portable storage medium as claimed in claim 4, wherein the encrypted data are recorded in one or more files, the encryption of the encrypted multimedia data is carried out so that corresponding decryption key data decrypts the one or more files, and identification data for specifying the one or more files are recorded on said portable storage medium.

7. A reproducing apparatus for reproducing encrypted data recorded on a portable storage medium, comprising:

a data reading unit that reads data recorded on the portable storage medium after insertion of the portable storage medium into the reproducing apparatus, wherein encrypted data is recorded on the portable storage medium prior to the insertion of the portable storage medium into the reproducing apparatus;

a communication unit that transmits, to a server via a network, a request for decryption key data corresponding to the encrypted data previously recorded on the portable storage medium and receives, via the network, the requested decryption key data from the server, the decryption key data being required for the reproducing apparatus to reproduce the encrypted data; and a processor that decrypts the encrypted data previously recorded in the portable storage medium with the received decryption key data.

8. The reproducing apparatus as claimed in claim 7, wherein the encrypted data are recorded in one or more files in said portable storage medium, the encryption is carried out so that corresponding decryption key data decrypts the one or more files, and identification data for specifying the one or more files are recorded in said portable storage medium, and said apparatus releases the encryption of the corresponding one or more files on the basis of the identification data.

9. The information reproducing method as claimed in claim 1, wherein the server is accessed on the basis of a URL recorded in the portable storage medium.

10. The information reproducing method as claimed in claim 1, wherein a program is recorded on the portable storage medium, and wherein the program is executed upon detecting the insertion of the portable storage medium into a device configured to receive the portable storage medium included in the information processing apparatus.

11. The information reproducing method as claimed in claim 1, wherein the portable storage medium is an optical disk.

12. The information reproducing method as claimed in claim 1, wherein the portable storage medium is a memory card.

13. The information reproducing method as claimed in claim 1, further comprising:

displaying associated information regarding contents stored on the portable storage medium.

14. The information reproducing method as claimed in claim 13, wherein the associated information is obtained from the server.

15. The information reproducing method as claimed in claim 1, further comprising:

entering user identification information and a password in order to receive the decryption key data issued by the server.

16. The information reproducing method as claimed in claim 15, wherein the user identification and password are input through a graphical user interface.

17. The information reproducing method as claimed in claim 1, further comprising:

downloading a program for decryption through the internet in order to decrypt multimedia data recorded on the portable storage medium.

18. The information reproducing method as claimed in claim 17, wherein the program is downloaded together with the decryption key data.

19. The information reproducing method as claimed in claim 1, further comprising:

displaying an associated home page upon the insertion of the portable storage medium into a portable storage medium receiving device included in the information processing apparatus, the home page allowing activation of encrypted content on the portable storage medium.

20. The information reproducing method as claimed in claim 1, wherein the encrypted data is multimedia data.

21. The information reproducing method as claimed in claim 1, wherein the encrypted data is audio data.

22. The reproducing apparatus as claimed in claim 7, wherein the request for the decryption key data is transmitted based on information recorded on the portable storage medium that specifies said server.

23. The reproducing apparatus as claimed in claim 22, wherein the server is accessed on the basis of a URL recorded in the portable storage medium.

24. The reproducing apparatus as claimed in claim 22, wherein a program is recorded on the portable storage medium, and wherein the program is executed upon detecting the insertion of the portable storage medium into a device configured to receive the portable storage medium included in the reproducing apparatus.

25. The reproducing apparatus as claimed in claim 22, wherein the portable storage medium is an optical disk.

26. The reproducing apparatus as claimed in claim 22, wherein the portable storage medium is a memory card.

27. The reproducing apparatus as claimed in claim 22, further comprising:
displaying associated information regarding contents stored on the portable storage medium.

28. The reproducing apparatus as claimed in claim 27, wherein the associated information is obtained from the server.

29. The reproducing apparatus as claimed in claim 22, further comprising:
entering user identification information and a password in order to receive the decryption key data issued by the server.

30. The reproducing apparatus as claimed in claim 29, wherein the user identification and password are input through a graphical user interface.

31. The reproducing apparatus as claimed in claim 22, further comprising:
downloading a program for decryption through the internet in order to decrypt multimedia data recorded on the portable storage medium.

32. The reproducing apparatus as claimed in claim 31, wherein the program is downloaded together with the decryption key data.

33. The reproducing apparatus as claimed in claim 22, further comprising:
displaying an associated home page upon insertion of the portable storage medium into a portable storage medium receiving device, the home page allowing activation of encrypted content on the portable storage medium.

34. The reproducing apparatus as claimed in claim 22, wherein the encrypted data is multimedia data.

35. The reproducing apparatus as claimed in claim 22, wherein the encrypted data is audio data.

36. A method of managing encrypted data recorded on a portable storage medium, comprising:
recording the encrypted data in the portable storage medium;
reading, at an information processing apparatus, data from the portable storage medium after insertion of the portable storage medium into the information processing apparatus, wherein the encrypted data is recorded on the portable storage medium prior to the insertion of the portable storage medium into the information processing apparatus;
transmitting, from the information processing apparatus to a server via a network, a request for decryption key data corresponding to the encrypted data previously recorded on the portable storage medium on the basis of information recorded in the portable storage medium, the decryption key being required for the information processing apparatus to reproduce the encrypted data;
receiving, at the information processing apparatus, the requested decryption key data from the server via the network; and
decrypting, at the information processing apparatus, said encrypted data using the received decryption key data.

37. The information managing method as claimed in claim 36, wherein the information is data for specifying said server.

38. The information managing method as claimed in claim 36, wherein the encrypted data are recorded in one or more files in the portable storage medium, and the encryption of the encrypted data is carried out so that corresponding decryption key data decrypts the one or more files, and in response to a user's selecting operation, said method further comprises:
issuing the decryption key data corresponding to the one or more files corresponding to the user's selecting operation.

39. The information managing method as claimed in claim 36, wherein charging processing is executed in accordance with the issuance of the decryption key data.

* * * * *